July 17, 1934.  F. G. FOLBERTH ET AL  1,966,621
THEFT PREVENTION DEVICE FOR VEHICLES
Filed April 14, 1931  3 Sheets-Sheet 1

Inventors
FREDERICK G. FOLBERTH
& WILLIAM M. FOLBERTH
By Richey & Watts
Attorneys

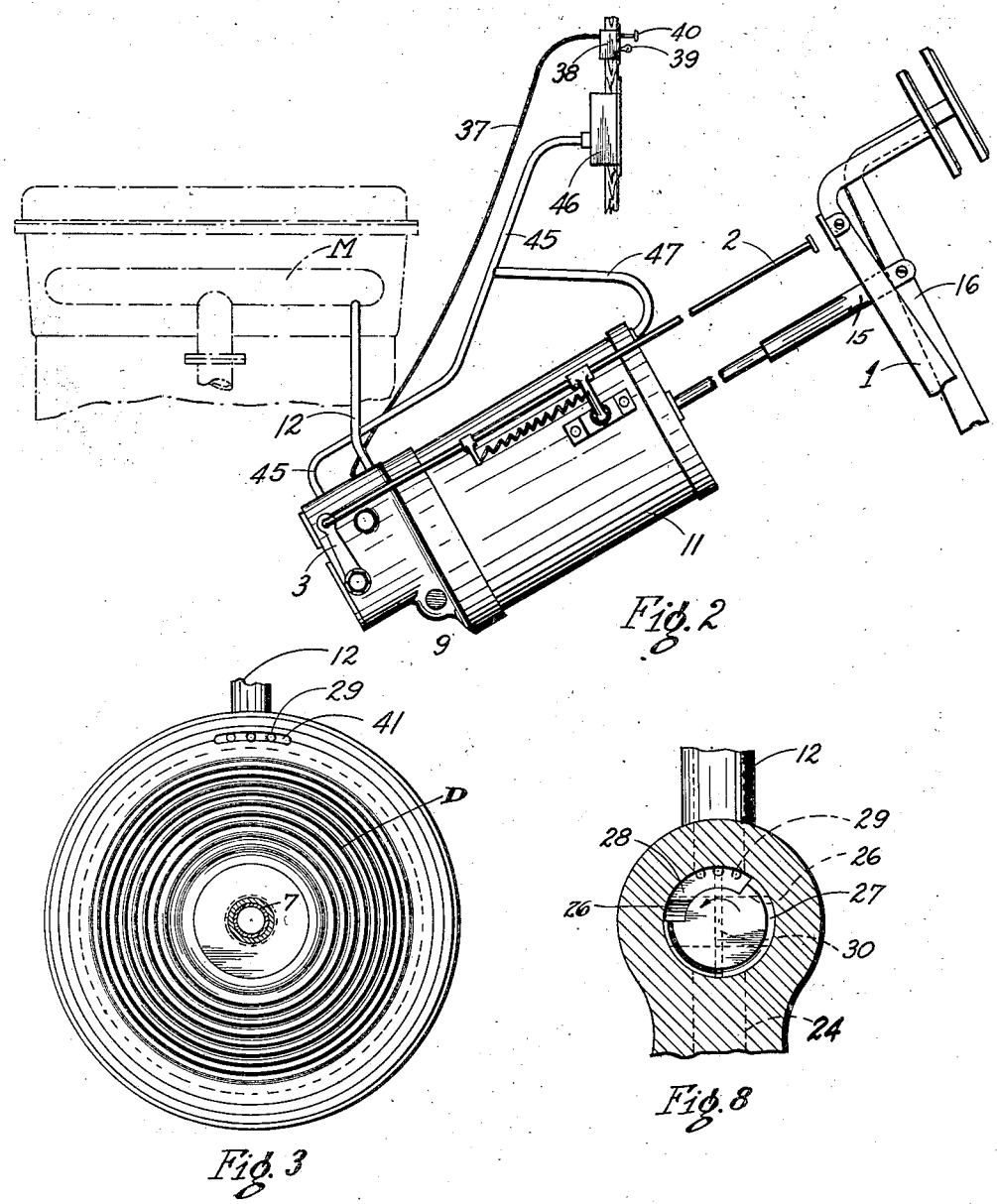

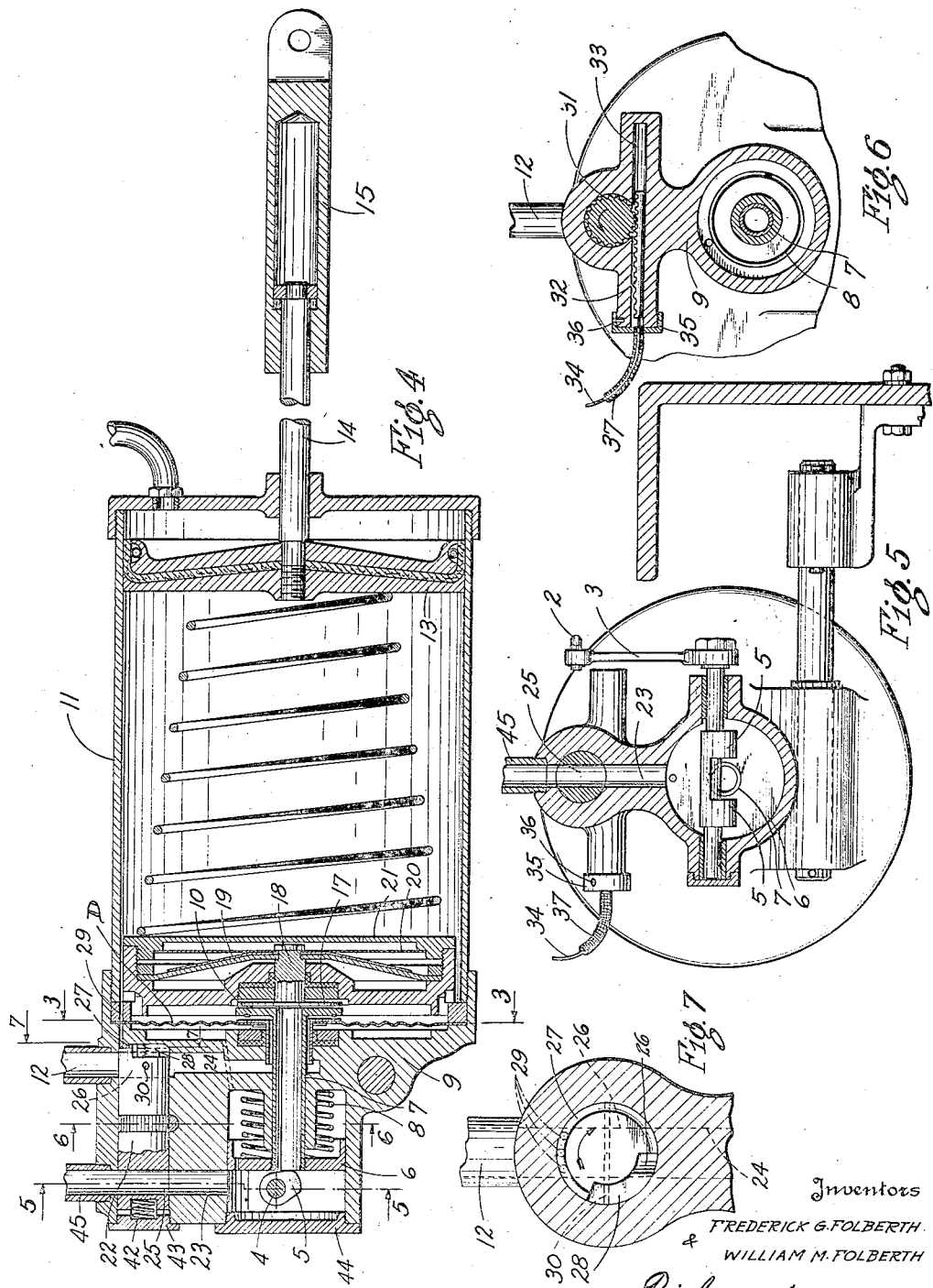

Patented July 17, 1934

1,966,621

UNITED STATES PATENT OFFICE 1,966,621

THEFT PREVENTION DEVICE FOR VEHICLES

Frederick G. Folberth and William M. Folberth, Cleveland, Ohio

Application April 14, 1931, Serial No. 529,986

12 Claims. (Cl. 188—152)

This invention relates to apparatus for locking motor vehicles to prevent theft, and more particularly to fluid pressure actuated means for applying the brakes of a motr vehicle to prevent theft thereof.

In our co-pending applications Serial No. 395,548, filed September 27, 1929, Serial No. 483,328, filed September 20, 1930, and Serial No. 533,076, filed April 27, 1931, we fully disclosed and claimed a clutch controlled vacuum actuated brake for motor vehicles, and the present invention, as illustrated and described herein, is adapted to be incorporated in a brake actuating device of the general type shown in said co-pending application.

It has frequently been proposed to operate the brakes of a motor vehicle by the partial vacuum created in the intake manifold of the engine when it is operating and it is among the objects of our invention to provide means, under the control of the operator of the vehicle, for causing the brake to be vigorously applied by the intake manifold vacuum whenever the engine of the car is started.

Other objects of our invention are: the provision of a lock for a motor vehicle which will positively prevent the vehicle being driven away under its own power by unauthorized persons but which will permit the vehicle to be pushed or towed at will; the provision of a clutch controlled vacuum actuated brake which may be so connected to the source of vacuum as to prevent unautohrized operation of the vehicle; the provision of an extremely simple, economical and foolproof lock for motor vehicles; the provision of vacuum brake actuating means having a locking device incorporated therein and operable at the will of the driver; the provision of key controlled or other tamper proof means for controlling the fluid pressure connection to the operating cylinder of a fluid pressure actuating device; the provision, in a fluid pressure brake system, of means for filtering the air which enters the mechanism from the atmosphere to prevent the entry of dust and other harmful substances; the provision of an improved form of control valve for fluid pressure brakes which gives an extremely sensitive and accurate braking effect.

The above and other objects of our invention will appear from the following description of a preferred form thereof, reference being had to the accompanying drawings in which—

Fig. 2 is an enlarged side elevation illustrating the general arrangement of the brake actuating mechanism and lock therefor.

Fig. 3 is a section taken on line 3—3 of Fig. 4.

Fig. 4 is a vertical section through the brake operating cylinder and the auxiliary locking valve.

Fig. 5 is a section taken on line 5—5 of Fig. 4 with the cylinder supporting bracket added.

Fig. 6 is a fragmentary cross section taken on line 6—6 of Fig. 4.

Fig. 7 is a section taken on line 7—7 of Fig. 4 and illustrating the end of the auxiliary locking valve.

Fig. 8 is a view similar to Fig. 7 but illustrating the valve in a different position.

Figure 1:
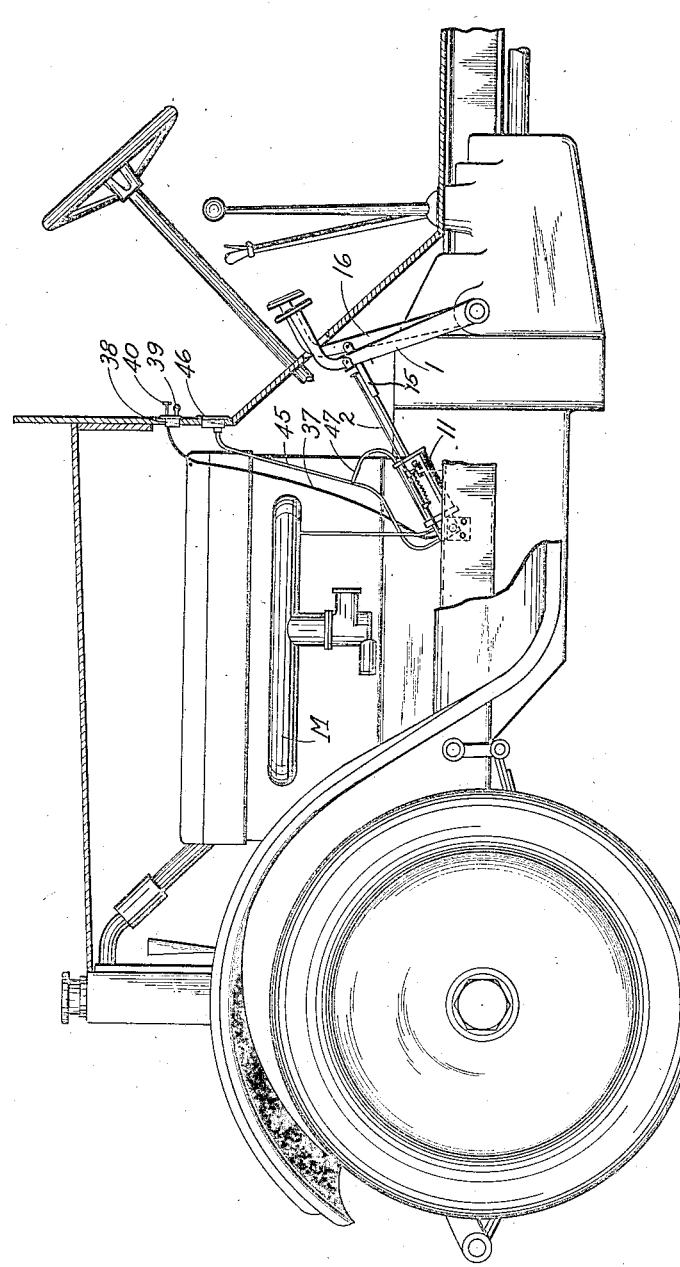
Fig. 1 is a sectional side view of an automobile illustrating the installation of my brake actuating and locking mechanism.

The normal driving operation of the vehicle illustrated in the drawings is substantially the same as that described in the above noted co-pending application. Briefly, the clutch operating lever 1 of the vehicle is adapted, when it reaches the end of its de-clutching movement, to engage the upper end of the rod 2. This rod 2 is pivotally connected at its lower end to the lever arm 3. A cross shaft 4 carrying cam portions 5 is operated by the lever 3. Rotation of the shaft 4 causes the cams 5 to engage the enlarged guiding head 6 on the tubular valve stem 7. A compression spring 8 is disposed between the head 6 and the valve casing casting 9 and tends to maintain the valve in its closed position. Movement of the valve stem 7 moves the valve closure member 10 and controls the withdrawal of air from the interior of the cylinder 11 through the pipe 12 which leads to the intake manifold M of the engine.

The piston 13 carries a piston rod 14 which extends out through the upper end of the cylinder 11 and has a lost motion connection through the hollow link member 15, to the brake pedal 16.

It will be seen that the above described arrangement of parts permits the vehicle brakes to be manually manipulated in the usual manner without interference with the vacuum actuated mechanism. However, in the preferred operation of the car the brakes will be entirely controlled by the clutch pedal. When the operator pushes the clutch pedal down the clutch is first disengaged and then, by further movement of the pedal, the valve member 10 is pushed away from its seat permitting air to be withdrawn from the cylinder 11 due to the suction in the intake manifold M. This creates a partial vacuum within the cylinder and causes the piston 13 to be drawn downwardly and apply the brake through the connection to the brake operating pedal.

When the valve member 10 is moved by the downward movement of the clutch pedal it engages the disc 17 which is connected through a rod 18 to the diaphragm 19. A disc 20 of spring bronze or other suitable material is secured to the rod 18 and engages the cover plate 21 at its periphery. This disc 20 acts as a spring to maintain the disc 17 normally in its farthest left position (Fig. 4). By providing the spring disc 20 a very compact structure is obtained and the desired spring action is secured.

As stated above this valve mechanism is substantially the same as that described and claimed in our co-pending application, Serial No. 483,328. However the control valve mechanism does not form a part of the present invention and it will be understood by those skilled in the art that our locking mechanism may be combined with other types of control valves if desired.

If the operator desires to prevent theft of his car he may do so by connecting the cylinder 11 directly to the intake manifold M of the engine after he stops the engine. It will be seen that, with this connection, as soon as the engine is started air will be withdrawn from the cylinder 11 and the piston 13 will be moved to apply the vehicle brakes. To facilitate this direct connection between the cylinder 11 and the manifold M, we have provided a cylindrical valve member 22 which is rotatably mounted in an aperture in the casing 9. This casing 9 is provided with a hole 23 through which the cylinder is connected to the atmosphere and a hole 24 which, with the pipe 12, is adapted to connect the cylinder to the intake manifold M. The valve member 22 is disposed in line with the holes 23 and 24 and is provided with holes 25 and 26 which are adapted to align with the holes 23 and 24 respectively when the valve member 22 is in its unlocked position (Fig. 4).

The above construction is clearly shown in Fig. 4 and it will be seen that when the valve member 22 is in the position there shown it will not in any way interfere with the normal operation of the brake mechanism.

Referring again to Figs. 4 and 7 it will be seen that the inner end of the valve 22 is bevelled as shown at 27 and has a cut-out portion 28 extending through approximately 90° of its circumference.

This cut-out portion 28 is cut back sufficiently far from the end of valve 22 so that when the valve member 22 is rotated through 90° from the position shown in Fig. 4, in the direction indicated by the arrow in Fig. 7, to the position shown in Fig. 8 it will permit air to flow through small holes 29 into the pipe 12 and thence to the manifold M. The holes 29 extend through the valve housing 9, the diaphragm D and the end of the cylinder 11 into the interior of cylinder 11. As later explained the circumferentially extending grooves 41 facilitate assembly of the apparatus and eliminate the necessity of exact alignment of the portions of the holes 29 in the housing 9 with the portions of the holes 29 in the end of the cylinder 11. A free passage for air is provided by the holes 29 and the grooves 41. A relatively small hole 30 may extend through the valve member 22 at right angles to the hole 26 and substantially at the center thereof. Gear teeth 31 are formed on the valve 22 and are engaged by a rack member 32 which is adapted for longitudinal sliding movement within the chamber 33 in the casing 9. A flexible wire 34 is secured to one end of the rack bar 32 and extends out through an end cap 35 which may be locked to the casing 9 by a pin 36 or other suitable means. Unauthorized manipulation of the wire 34 is prevented by the tubular casing 37. This tubular casing 37 may be flexible armored conduit, metal tube or the like. The wire 34 and its armored housing 37 extends to and enters the lock 38 which may be secured at any convenient place such as on the dashboard of the vehicle. The lock 38 may be of any suitable type operated by a key 39 and adapted to prevent movement of the plunger 40, which is connected to push and pull the end of the wire 34, when it is desired to lock the vehicle.

We prefer to so construct the lock 38 that when the plunger 40 is pulled out the valve 22 will be moved to the position shown in Fig. 4 and the vehicle adapted for normal operation. When the plunger 40 is pushed inwardly it will be automatically locked in position when the valve 22 is turned through 90°. Before being able to pull out the plunger 40 and restore the brake mechanism to normal operation, it will be necessary to insert and turn the key 39 in the lock 38. Although we have illustrated and described a key operated lock it will be seen that other types of tamper proof locking mechanisms may be utilized and it is intended that the terms "key controlled," "key actuated," and "tamper proof" include all suitable locking mechanisms for preventing unauthorized operation of the valve.

When the rack 32 is in the position shown in Fig. 6 the plunger 40 is out and the valve 22 is in position shown in Figs. 4 and 7. When the plunger 40 is pushed in the rack 32 will move to the right thus turning the valve 22 through 90° in the direction shown by the arrow. This latter movement will cause the holes 25 and 26 to be disposed horizontally completely closing off the hole 23 from the atmosphere and connecting the hole 24 to the intake manifold M only through the relatively small hole 30. The cut-out portion 28 on the end of the valve 22 will now be in the position shown in Fig. 8 and will provide a direct connection through the tube 12 and the holes 29 between the interior of the cylinder 11 and the intake manifold M. Thus as soon as a partial vacuum is created in the intake manifold upon starting the vehicle engine, the piston 13 will be moved to apply the brakes of the vehicle. It will now be impossible to drive the car because as soon as it is thrown into gear the motor will either be immediately stalled or the brakes, being strongly applied, will so retard the vehicle that it will be impossible to drive it.

As best seen in Fig. 3 we prefer to provide a number of small holes 29 extending through the valve housing 9 into the cylinder 11 and to form circumferential grooves 41 both in the end of the cylinder and in the housing 9. This facilitates assembly of the parts as it eliminates the necessity of exact alignment of the portions of the holes 29 in the housing 9 with the portions of the holes in the end of the cylinder.

The cylindrical valve 22 is maintained in position with its bevelled end 27 seated against a corresponding bevelled portion of the housing 9 by means of a spring 42. The cover plug 43 is adapted to be screwed into a suitable aperture in the housing 9 and maintains the spring 42 under the proper compression to hold the valve 22 in place, while permitting free rotation thereof by the rack bar 32. This cover plug 43 also prevents the entry of dust or other foreign material to the valve and forms a completely enclosed structure. An end cap 44 is adapted to enclose the valve actuating cams 5 and it will be seen that the entire locking and controlling mechanism is completely enclosed. The end plugs or caps 43 and 44 may be welded or otherwise permanently secured to the casing 9 to prevent tampering with the valve mechanism.

Referring particularly to Fig. 2 it will be seen that the pipe 45 extends from the hole 23 to the air filter 46 and the pipe 47, through which the upper end of the cylinder 11 is connected to the atmosphere, is also connected to the air filter 46 through the pipe 45. By means of these connections all of the air which enters the valve mechanism and the cylinder 11 from the atmosphere must first pass through the air filter 46 which may be of any suitable construction and adapted to remove the dust and other harmful substances from the air. These connections tend to considerably increase the life of the apparatus. It will be understood that although the air filter 46 is shown installed on the dash of the vehicle it may be located at any suitable and convenient place.

It will be seen by those skilled in the art that we have provided a simple and efficient lock which is compactly combined with the valve mechanism for controlling the operation of the brakes. Although we have illustrated and described a preferred form of our invention, modifications and variations thereof may appear to those skilled in the art and we do not, therefore, limit ourselves to the exact form herein shown and described but claim as our invention all embodiments thereof coming within the scope of the appended claims.

We claim:

1. In an automotive vehicle having an internal combustion engine, the combination of a brake, a cylinder, a piston in said cylinder, operating connections between said piston and said brake, fluid conducting connections between said cylinder and the intake manifold of the vehicle engine, a valve for controlling the flow of air between one end of said cylinder and manifold and said end of said cylinder and the atmosphere, auxiliary valve means for by-passing said control valve to directly connect said cylinder to said manifold and close the connection between said end of the cylinder and the atmosphere and key-controlled locking means for securing said auxiliary valve means in by-passing position.

2. In combination, an internal combustion engine, a cylinder, fluid conducting connections between said cylinder and the intake manifold of said engine, a piston in said cylinder, a control valve in said fluid connections, an auxiliary locking valve adapted to by-pass said control valve and connect said cylinder directly to said manifold, and key-controlled means for locking the position of said auxiliary valve.

3. A theft preventing device for an automotive vehicle having a brake comprising vacuum actuated means for applying the vehicle brake, fluid conducting connections between said means and the intake manifold of the vehicle engine, valve means for controlling the flow of air through said connections and substantially tamper proof, key-controlled means for locking said valve means in position to connect said brake applying means to the manifold whereby the vehicle brakes will be applied when the engine is running.

4. In apparatus of the class described a cylinder, a piston in said cylinder, a valve casing disposed at one end of said cylinder, said casing having a passage adapted to connect said cylinder to the atmosphere and a passage adapted to connect the cylinder to a source of piston actuating pressure, a valve for controlling said passages, an auxiliary valve adapted when in one position to permit free flow through both said passages when in another position to completely close said passage to the atmosphere and to connect said cylinder directly to the source of actuating pressure, and means for locking said auxiliary valve in said last named position.

5. In apparatus of the class described a cylinder, a piston in said cylinder, a valve casing disposed at one end of said cylinder, said casing having a passage adapted to connect said cylinder to the atmosphere and a passage adapted to connect the cylinder to a source of piston actuating pressure, a valve for controlling said passages, an auxiliary valve adapted when in one position to permit free flow through both said passages and when in another position to completely close said passage to the atmosphere and to connect said cylinder directly to the source of actuating pressure, means for operating said auxiliary valve and means for locking said auxiliary valve in said last named position.

6. A theft preventing device for automotive vehicles comprising a cylinder, a piston in said cylinder, operating connections between said piston and the vehicle brakes, a valve housing, fluid pressure conducting connections from said cylinder, through said valve housing, to the intake manifold of the vehicle engine, a valve in said housing adapted when in one position to shut off said cylinder from said manifold and when in another position to connect said cylinder and manifold through said fluid pressure connections, means operable from the driver's seat of the vehicle for controlling the position of said valve and a tamper proof lock, operable from the driver's seat, for locking said valve in position to connect said cylinder to the intake manifold.

7. A valve for controlling the flow of actuating fluid to and from the cylinder of a vehicle brake actuating device, comprising a casing having a passage leading from the cylinder to the atmosphere and a passage leading from the cylinder to a source of actuating pressure, a cylindrical valve member having passages whereby when the valve member is in one position the cylinder is connected to the atmosphere and when in another position the cylinder is connected to the source of actuating pressure, gear teeth on said cylindrical valve member, a valve actuating member having gear teeth engaging said teeth on the valve, means operable from the driver's seat of the vehicle for operating said valve actuating member to change the position of said valve, and means for locking the position of said valve actuating member operating means.

8. In a theft preventing device for automotive vehicles, the combination of fluid pressure actuated means for retarding the movement of the vehicle, a valve for controlling said fluid pressure actuated means, means for operating said valve and substantially tamper proof means for locking said valve in position to cause said fluid pressure actuated means to retard movement of the vehicle.

9. In apparatus of the class described, the combination of fluid pressure actuated means for retarding the movement of a vehicle and a key actuated lock for controlling the operation of said retarding means.

10. In apparatus of the class described, the combination of a fluid pressure actuated brake, a valve for controlling the operation of said brake under normal driving conditions, an auxiliary valve adapted when in one position to render said valve ineffective and to provide connections whereby said fluid pressure actuated brake will be applied, and substantially tamper proof locking means for maintaining said auxiliary valve in said position.

11. A key controlled valve comprising a housing having passages therethrough, a cylindrical valve member rotatably supported in said housing and having passages adapted to register with said passages in said housing, gear teeth on said valve member, a rack supported in said housing for longitudinal movement and having teeth engaging the teeth on said valve member, means for moving said rack from a point remote from said housing and means for locking said rack moving means to prevent unauthorized operation of the valve.

12. In apparatus of the class described, a cylinder, a piston in said cylinder, a valve casing disposed at one end of said cylinder, said casing having a passage adapted to connect said cylinder to the atmosphere and a passage adapted to connect said cylinder to a source of piston actuating pressure, an air filter, fluid conducting connections between said filter and the atmosphere passage to said cylinder whereby air entering said cylinder from the atmosphere will be filtered, a valve for controlling the flow of air through said passages, an auxiliary valve adapted when in one position to permit a free flow through both said passages and when in another position to close said passage to the atmosphere and to connect said cylinder directly to the source of actuating pressure, means for operating said auxiliary valve and means for locking said auxiliary valve in said last named position.

FREDERICK G. FOLBERTH.
WILLIAM M. FOLBERTH.